United States Patent

Takayama et al.

[11] Patent Number: 5,177,123
[45] Date of Patent: Jan. 5, 1993

[54] SELF-LUBRICATED POLYACETAL MOLDING COMPOSITIONS AND MOLDED ARTICLES FORMED THEREOF

[75] Inventors: Katsunori Takayama; Toshihiko Endo; Osamu Kanoto; Nobuyuki Matsunaga, all of Shizuoka, Japan

[73] Assignee: Polyplastics Co., Ltd., Osaka, Japan

[21] Appl. No.: 598,234

[22] Filed: Oct. 16, 1990

[30] Foreign Application Priority Data

Oct. 20, 1989 [JP] Japan .................. 1-273248

[51] Int. Cl.⁵ .............................. C08M 9/10
[52] U.S. Cl. .................... 523/210; 523/212; 523/213; 524/263; 524/267; 524/493; 524/500
[58] Field of Search ........... 524/263, 267, 500; 523/210

[56] References Cited

U.S. PATENT DOCUMENTS

| | | | |
|---|---|---|---|
| 2,940,947 | 6/1960 | Welch et al. | 524/269 X |
| 3,214,291 | 10/1965 | Dixler | 524/269 X |
| 3,629,177 | 12/1971 | Hoffmann | 524/161 |
| 4,020,217 | 4/1977 | Karasudani et al. | 524/269 X |
| 4,225,456 | 9/1980 | Schmidt et al. | 524/269 X |
| 4,383,057 | 5/1983 | Yamamoto et al. | 524/503 X |
| 4,390,656 | 6/1983 | Weise et al. | 524/503 X |
| 4,596,847 | 6/1986 | Kasuga et al. | 524/220 |
| 4,600,735 | 7/1986 | Larsson et al. | 524/503 X |
| 4,661,549 | 4/1987 | Walker | 524/397 |
| 4,678,828 | 7/1987 | Nakamura et al. | 524/269 X |
| 4,833,187 | 5/1989 | Sittenthaler et al. | 524/268 X |
| 4,873,282 | 10/1989 | Yui et al. | 524/496 |
| 4,879,331 | 11/1989 | Endo et al. | 524/267 |
| 5,037,871 | 8/1991 | Jones | 524/269 X |

FOREIGN PATENT DOCUMENTS

| | | |
|---|---|---|
| 0242037 | 10/1987 | European Pat. Off. . |
| 0290230 | 11/1988 | European Pat. Off. . |
| 0275357 | 12/1986 | Japan .................. 524/269 |
| 202373 | 9/1987 | Japan . |
| 1129067 | 5/1989 | Japan . |
| 0197809 | 9/1978 | Netherlands .......... 524/269 |
| 0927517 | 5/1963 | United Kingdom .... 524/269 |
| 1325268 | 8/1973 | United Kingdom . |

Primary Examiner—Joseph L. Schofer
Assistant Examiner—J. M. Reddick
Attorney, Agent, or Firm—Nixon & Vanderhye

[57] ABSTRACT

Self-lubricating polyacetal resin compositions and molded articles (e.g. "wear parts") formed thereof include a polyacetal base resin, and a self-lubricating effective amount of a silica powder in which a silicone polymer (e.g. silicone oil) is absorbed. The silica powder acts as a carrier for the silicone polymer so as to improve the dispersibility of the silicone polymer in the polyacetal base resin as well as to allow greater silicone polymer "loading" of the polyacetal base resin. As a result, improved lubricant dispersibility and sliding characteristics are achieved.

12 Claims, 1 Drawing Sheet

SELF-LUBRICATED POLYACETAL MOLDING COMPOSITIONS AND MOLDED ARTICLES FORMED THEREOF

RELATED APPLICATIONS

This application may be deemed to be related to copending and commonly owned U.S. patent application Ser. No. 07/587,951 filed on Sept. 25, 1990, the entire content of which is incorporated hereinto by reference.

FIELD OF THE INVENTION

The present invention generally relates to self-lubricated polyacetal molding compositions which exhibit anti-friction and wear-resistant properties, to processes for making such compositions, and to molded sliding members (e.g., wear parts) formed of the same. In preferred embodiments, the self-lubricated polyacetal resin compositions will be comprised of a blend of a polyacetal base resin, and a self-lubricating effective amount of a silica powder in which a silicone polymer (e.g. silicone oil) is absorbed.

BACKGROUND AND SUMMARY OF THE INVENTION

Polyacetal resins are well known engineering resins due to their balanced mechanical properties. In this regard, polyacetal resins usually exhibit desirable physical properties in terms of their frictional and abrasive characteristics, electrical properties and chemical and heat-resistance properties. Certain properties of the polyacetal resin are, however, required to be continually improved due to special environments of use.

The sliding characteristics of polyacetal resins are examples of properties which sometimes need improvement. In this regard, polyacetal resins have recently been employed as guide members for travelling magnetic tapes of audio and video machines, as well as for guide posts of tape cassettes. Other representative examples of sliding parts where strict requirements for sliding characteristics must be satisfied include guide members, such as guide rollers and guide posts for use in the tape travel system of VTRs, 8 mm VTRs and the like.

In general, guide members made of machined metallic materials have been employed in the above-noted end-use applications. When using metallic materials, however, it is necessary that precautions be observed in order to prevent damage to the tape due to sliding contact with the guide member during operation. In this regard, it is thus usually necessary to reduce the friction coefficient of metallic guide posts by subjecting the surface which contacts the tape to a surface-smoothing treatment, such as plating, polishing, lapping and the like. Such surface treatments are economically disadvantageous (i.e. the cost of the guide members increases) and necessarily require separately handling and/or special fabrication techniques in order to prevent the guide post from being damaged prior to use.

For these reasons, proposals have been made to incorporate various lubricants in resin guide members so as to provide alternative materials for conventional metals used in such end-use applications. Polyacetal resins having excellent mechanical properties, electrical properties, chemical resistance properties and the like have specifically been proposed to be employed as an alternative material to conventional metallic tape guide posts by incorporating various lubricants in polyacetal base resins. Examples of lubricants that have been proposed include fluororesins, polyolefin resins and silicone resins. In addition, solid lubricants, such as graphite and molybdenum disulfide, and lubricating oils such as paraffin oils, spindle oils and silicone oils, have been proposed. In particular, various proposals have been advanced regarding incorporating silicone oil (which exhibits excellent heat-resistance properties, low-temperature characteristics, and chemical and physical stability) into polyacetal base resins.

In general, most lubricants (including silicone oil) typically exhibit very poor compatibility characteristics with respect to their affinity to polyacetal resins. This incompatability between polyacetal resins on the one hand and lubricants (including silicone oil) on the other hand, thus makes it very difficult to incorporate such lubricants into the polyacetal resins in a homogenous manner during preparation.

Furthermore, even when compositions are successfully prepared, lubricating oils usually tend to bleed from the surface of the resin during molding so that relative sliding occurs between the individual resin particles and/or between the resin particles and the screw of a conventional screw extruder. This in turn causes the resin to experience poor "bite" by the screw and thus insufficient plasticization of the resin ensues. In extreme cases, such incompatability between lubricating oils and polyacetal base resin makes it impossible to conduct molding operations. As noted above, however, even if such molding is successfully performed, the lubricating oil usually "bleeds" from the surface of the molded article and thus transfers and/or adheres to the tape surface in contact therewith. As a result, the lubricant-contaminated tape usually is discolored. Furthermore, lubricating oils disadvantageously lower the surface hardness of the molded article.

As mentioned briefly above, several proposals have been made regarding improving the self-lubricity characteristics of polyacetal base resin including the addition of lubricating oils, particularly silicone oils. More specifically, it has been proposed in the past to introduce silicone oils into polyacetal base resins together with a carrier substance for the silicone oil so as to alleviate the above-described problems relating to dispersability and/or compatability of the silicone oil with respect to the polyacetal base resin. Examples of inorganic carriers that have been proposed in the past include active carbon and graphite, while examples of organic carriers include high molecular weight polyethylene, ethylene copolymers, and silicone rubber.

Active carbon and graphite, however, are incapable of satisfactorily absorbing and holding silicone oil. High molecular weight polyethylene and ethylene copolymers and the like similarly exhibit poor affinity to silicone oils and therefore are less than satisfactory. Silicone rubber, on the other hand, although exhibiting satisfactory compatability with silicone oil (and thus can considerably improve the processing and fabrication characteristics of the resin) is incapable of satisfactorily retaining the silicone oil under sliding conditions. Furthermore, silicone rubber flows when subjected to elevated temperatures thereby causing the rubber to congregate on the surface of molded resin articles. As a result, a thin film is formed on the surface of the molded article which easily peels off when subjected to external stress—i.e. as may be encountered by contact with a running audio/visual tape. Thus, the silicone oil carriers that have been proposed in the past do not alleviate the "bleeding" problems that have been encountered with respect to silicone oils.

Although the addition of fluororesins, olefin resins and the like serve to improve the sliding characteristics of polyacetal resin to some extent, such resins in and of themselves typically exhibit poor compatability with the polyacetal resin. Thus, surface-peeling of molded articles and/or formation of mold deposits during fabrication of such molded articles usually ensues. Furthermore, addition of such solid lubricants can cause the sliding properties to gradually degrade over time due to a powder film forming on the surface of the wear part due to the abrasion of the tape in contact with the surface of the molded article.

As is evident from the above discussion, the known prior art techniques for providing self-lubricity and/or anti-frictional characteristics to polyacetal resins have yet to produce satisfactory results for short-term and long-term sliding characteristics. Therefore, further improvements in this regard have been needed. It is towards satisfying such a need that the present invention is directed.

According to the present invention, improved self-lubricity properties may be obtained for polyacetal resin compositions by blending with a polyacetal base resin, a self-lubricating effective amount of silica powder in which a silicone polymer (e.g. a silicone oil) has been absorbed. The silica powder (which is highly compatible with the polyacetal base resin) is easily dispersed throughout the polyacetal base resin so that the lubricating properties of the silicone oil can be fully realized. Moreover, the silica powder satisfactorily retains the silicone oil in the composition. As a result, problems associated with "bleeding" of the silicone oil onto surfaces of molded parts formed of the compositions of the present invention are alleviated.

Preferably, the compositions of the present invention include a polyacetal base resin and, melt-blended therewith, between 0.5 to 25% by weight (based on the total composition weight) of a silica powder in which a silicone polymer has been absorbed. Molded articles, such as guide members or magnetic tape travel systems (particularly guide posts for tape cassettes) will thus exhibit satisfactory self-lubricity properties. The compositions of the present invention most preferably include between 75 to 99.5 wt % of a polyacetal base resin, and between 0.5 to 25 wt % of a silica powder in which between 20 to 80 wt % (based on the weight of the silica powder) of a silicone polymer is absorbed.

Further aspects and advantages of the present invention will become more clear after careful consideration.s given to the following detailed description of the preferred exemplary embodiments thereof which follow.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1A:
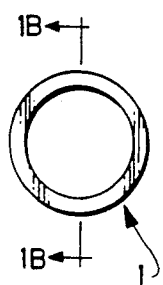
FIGURE 1A is an end elevation view of a molded cylindrical tape guide post according to the present invention.

The polyacetal base resins that may be used satisfactorily in the compositions of the present invention may be any polyacetal homopolymer or polyacetal copolymer having a main chain principally composed of repeating oxymethylene ($-CH_2O-$) units. Furthermore, polyacetal resins modified by cross-linking or graft copolymerization according to known techniques may also be used as the base resins according to the compositions of the present invention. The degree of polymerization for the polyacetal base resin is not particularly limited, provided that the moldability of the resin is not affected.

As noted previously, the compositions of the present invention are especially characterized by incorporating a silica powder in which a silicone polymer has been absorbed. The silicone-absorbant silica powder that is satisfactorily used in the compositions of the present invention is preferably one prepared by blending finely divided silica with between 20 to 80 wt. % of a silicone polymer, allowing the silica to absorb the silicone polymer, and then forming a powder of the resulting silicone-absorbed silica.

Specific examples of silicone-absorbant silica powder useable in the compositions of this invention include finely divided silicic anhydride prepared by dry processing, natural silicic acid and silicates and hydrous silicic acid prepared by wet processing. Among these, finely divided silicic anhydride is preferred.

The silicone polymer that is absorbed into the silica is preferably selected from silicone oil, silicone rubber and/or silicone resin, with silicone oil being especially preferred. Silicone oils that may be used include unsubstituted dimethylpolysiloxane, or dimethylpolysiloxane wherein some of the methyl groups are substituted by one or more substituents selected from hydrogen, phenyl groups, halogenated phenyl groups, halogenated alkyl groups, and fluoroester groups.

Although there is no particular limitation on the viscosity of the silicone oil that may be used, it is preferably between 500 to 200,000 cSt (at 25° C) in consideration of several factors, including its absorption into the silica, production of the silica powder, dispersibility of the silicone-absorbed silica product into the resin, workability of the resin during melt-kneading and molding, improvements in the sliding property, and the longevity of such improvements.

The above-described silicone-absorbant silica powder preferably has a mean particle diameter of between 5 to 300 μm to ensure that it is dispersible into the polyacetal base resin, and the resin composition exhibits satisfactory workability during melt-kneading processing. More preferably, the mean particle diameter of the silicone-absorbant silica powder is 200 μm or less. The silicone-absorbant silica powder is preferably blended into the polyacetal base resin in an amount between 0.5 to 25% by weight (based on the total composition weight). When the amount of the silicone-absorbed silica powder is less than 0.5% by weight, no significant improvements in the self-lubricity properties of the polyacetal composition are obtained. On the other hand, when the amount of the silicone-absorbing silica powder exceeds 25% by weight, then the other desirable properties of the polyacetal base resin deteriorate. The silicone-absorbant silica powder is most preferably blended with the polyacetal base resin in an amount between 2 to 20% by weight, and especially between 3 to 15% by weight.

As noted previously, the present invention is especially characterized by the addition of a silicone polymer-absorbing silica powder to the polyacetal resin. In this regard, it is known that silicone polymers, particularly silicone oils, may be added alone or in combination of two or more of the same with an inorganic powder during extrusion. In such a situation, however, the inorganic powder does not include any pre-absorbed silicone oil therein. Nonetheless, separately adding silicone oil and inorganic powders during extrusion typically results in improvements to the sliding properties of the resulting resin composition as compared to the use of other known lubricants. However, when lubricants are needed to be added in relatively large amounts so as to achieve even further improvements in lubrication, the lubricant is non-uniformly dispersed within the base resin (i.e. due to its poor compatibility therewith). This, in turn, causes various problems during manufacture (e.g. during extrusion and/or molding). Furthermore, even when silicone oil is incorporated into base resins, there is a possibility that it will "bleed" onto the surfaces of molded articles thereby making it impractical for use as a component for tape travel guide members, for example, since the silicone oil may detrimentally affect the tape in contact therewith.

In contrast, however, the addition of a silica powder having silicone polymer (e.g. silicone oil) absorbed therein according to the present invention provides a material that is especially adaptable for use as a tape cassette guidepost since the above-noted disadvantages associated with the separate addition of inorganic powders and silicone oils have been alleviated. In addition, the use of silica powder in which silicone oil has been absorbed imparts excellent effects with respect to the sliding characteristics of the resulting resin composition that are necessary for tape guide members.

It should also be noted that the addition of an inorganic rigid material has typically been thought to be detrimental to sliding properties of resin compositions, such as wear and abrasion resistance properties. However, according to the present invention, the addition of silica powder (itself an inorganic rigid material) having a silicone polymer absorbed therein is surprisingly free from the disadvantages typically associated with inorganic rigid materials in terms of detrimentally affecting the resin compositions' sliding characteristics.

In addition to the necessary components described above, the resin compositions of the present invention may include known stabilizers for the purpose of enhancing the weather/light stability of the resin composition. Furthermore, other various additives typically incorporated in engineering plastics may be added to the resin compositions of the present invention as may be desired to achieve specific physical properties. Examples of such additives include colorants, such as dyes and pigments, lubricants, mold release agents, plasticizers, crystallization promoters, nucleating agents, anti-static agents, surfactants, impact-modifying polymers and organic improvers.

In addition, fibrous, flaky or particulate inorganic, organic and/or metallic fillers may be used either alone or in the form of a mixture of two or more of the same. In this regard, the amount of the fillers incorporated into the resin compositions of the present invention should not be excessive so as to detract from the sliding characteristics of the resin composition which is achieved by means of the present invention. When the composition of the present invention is used to form tape travel guide members, electrostatic charges may build up over time and thereby cause some problems. In this respect, it is thus particularly preferred to incorporate an anti-static agent into the compositions of the present invention so as to counteract this tendency in this specific end-use application.

The compositions according to the present invention can easily be prepared by known techniques which have been generally used in preparing conventional resin compositions. For example, the ingredients may first be mixed and then kneaded and extruded in a uniaxial or biaxial extruder to prepare pellets. Pellets may then be molded to form molded sliding members. Alternately, pellets having different compositions may be prepared as a master batch with a specific amount of such pellets being mixed with other components (diluted) and then molded to form sliding members. In the preparation of the compositions according to the present invention, it is most desirable to improve the dispersibility of the additives whereby at least part of the polyacetal base resin is ground into a powder which is then mixed with the other components. The thus obtained mixture may then be extruded to form pellets and/or a final molded article.

As should now be more apparent, the resin compositions of the present invention are especially adapted to being formed into components whereby self-lubricating properties are important—such as for use as tape guide members for the audio and video magnetic tape equipment (e.g. VTRs, audio cassette players/recorders and the like). The compositions of the present invention are, moreover, suitable for use as an alternative for various sintered alloy bearings (e.g. motor bearings, end bearings, capston bearings, and the like) or as mechanical parts for various equipment outside of the video and audio field e.g., as components for clocks, facsimile machines, computers, and automotive components. Suffice to say that, due to the compatability of the silicone polymer in the polyacetal resin that is promoted by means of the present invention (e.g. the lack of "surface bleeding"), the compositions of the present invention may be satisfactorily employed as self-lubricating "wear parts" for a variety of end-use applications.

Further understanding of the present invention will be become more clear after careful consideration is given to the following non-limiting examples:

EXAMPLES

Test pieces were evaluated to obtain the data noted in the accompanying Tables were conducted according to the following techniques:

(1) Extrudability (observation during pelletization of the composition)

Extrusion was conducted with a twin-screw extruder equipped with a vent having an inner diameter of 30 mm to observe the state of extrusion. The bite of the screw, vent-up, strand-foaming, surging phenomenon, and the like were visually observed and collectively evaluated according to the following five qualitative ranks.

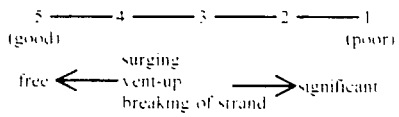

(2) Moldability

Plasticization time was measured with a screw-type injection molding machine operating with a cylinder temperature of 190° C., and screw speed of 120 RPM/ A large value of plasticization time indicates the moldability of the resin is poor because of "slippage" of the pellet on the screw (i.e. poor "bite").

(3) Surface Bleeding

Figure 1B:
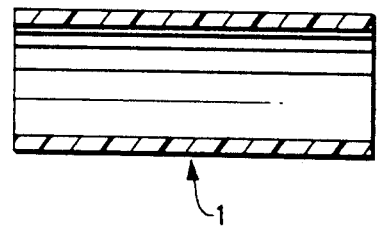
FIGURE 1B is a cross-sectional elevational view of the guide post shown in FIGURE 1A, as taken along line 1B—1B therein.

A cylindrical molded article (guide post) shown in FIGS. 1A and 1B was produced. A VTR tape was wound around the post and allowed to stand in a thermo-hygrostat (80° C., 95% RH) for 150 hr. The bleeding, transfer and adhesion of oil on the molded article and onto the magnetic tape were visually observed and evaluated according to the following five qualitative ranks.

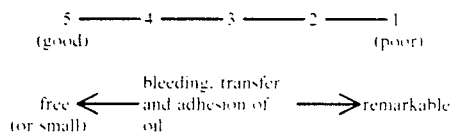

(4) Coefficient of friction

Figure 2:
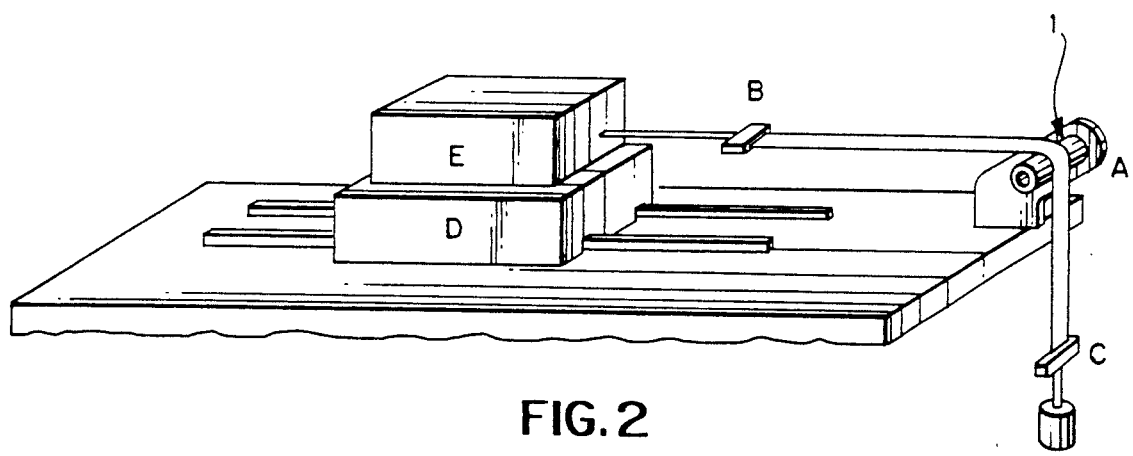
FIG. 2 is a schematic perspective view of the testing machine used in the following Examples to determine the coefficients of friction for the molded test pieces.

A cylindrical molded article shown in FIGS. 1A and 1B was mounted on part A of a testing machine shown in FIG. 2. A VTR tape having a length of 20 cm was fixed to part B, and a load of 100 g was applied to part C. A movable part D was reciprocated to bring the molded article into sliding contact with the tape, and the coefficient of friction ($\mu$) was determined by means of a U gage E and evaluated. The following conditions were maintained during the evaluation:
Environmental conditions: 23° C., 50%RH
Number of reciprocation runs: 100

(5) Surface roughness

The surface roughness in the axial direction of a cylindrical molded article as shown in FIG. 1 was measured by means of a surface roughness and configuration measuring machine manufactured by Tokyo Seimitus Co., Ltd. (Surfcom S54A).

(6) Surface hardness (Vickers hardness)

The surface hardness of a cylindrical molded article as shown in FIGS. 1A and 1B was measured by means of a microvickers hardness meter manufactured by Matsuzawa Seiki Co., Ltd. (MHT-ILS). The larger the value, the harder the molded article.

(7) Service test (travelling test)

A metallic guide post was removed from a commercially available VHS tape cassette (Scotch EG120: a product of Sumitomo 3 M), and a cylindrical molded article having the same dimension was inserted into the same place to prepare a test cassette. The following tests were conducted by making use of this test cassette.

(a) Travelling time (FF and REW times)

The above-described cassette was mounted on a commercially available VHS tape deck, and FF (fast-forward) and REW (rewind) operations were conducted to measure the tape travelling time per reciprocation. The results were compared with those of a commercially available VHS tape cassette provided with a metallic guide post. A larger value and scattering of values indicate poor tape sliding characteristics.

(b) Tape flaws after travelling test

FF and REW operations of the test cassette were repeated 50 times in the VHS tape deck. The contact surface of the tape of the test cassette was then observed under a metallographical microscope. Flaws in the tape surface were evaluated using the five following qualitative ranks:

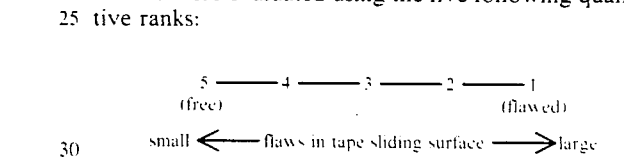

EXAMPLES 1 TO 6 AND COMPARATIVE EXAMPLES 1 TO 11

A polyacetal resin (Duracon M90; a product of Polyplastics Co., Ltd.) was blended with a silica powder having various silicone oils absorbed therein in proportions specified in Table 1. The blend was melt-kneaded with a twin-screw extruder to pelletize the composition. A test piece was then prepared from the pellets by injection molding. The test piece was then evaluated in the manner described above.

For comparison purposes, test pieces formed from compositions that lacked a silica powder and compositions separately containing a silicone oil and/or silica powder were also evaluated as shown in Table 2.

COMPARATIVE EXAMPLE 12

Service tests (travelling tests) as described above were conducted using a commercially available tape cassettes. The results are given in Table 2.

TABLE 1

|  |  | Example | | | | | |
|---|---|---|---|---|---|---|---|
|  |  | 1 | 2 | 3 | 4 | 5 | 6 |
| polyacetal resin | wt % | 95 | 90 | 85 | 80 | 90 | 90 |
| silica powder A *1 | wt % | 5 | 10 | 15 | 20 | — | — |
| silica powder B *2 | wt % | — | — | — | — | 10 | — |
| silica powder C *3 | wt % | — | — | — | — | — | 10 |
| extrudability |  | 5 | 5 | 4 | 4 | 5 | 5 |
| moldability | sec | 1.8 | 2.0 | 2.0 | 2.2 | 2.0 | 2.0 |
| bleeding of oil |  | 5 | 5 | 5 | 4 | 5 | 5 |
| coefficient of friction |  | 0.28 | 0.25 | 0.24 | 0.23 | 0.25 | 0.25 |
| surface roughness | $\mu$ | 0.18 | 0.09 | 0.08 | 0.08 | 0.09 | 0.09 |
| surface hardness |  | 9.0 | 11.6 | 12.7 | 12.7 | 11.7 | 11.5 |
| service test travelling time: |  |  |  |  |  |  |  |
| 1st travel | sec | 640 | 600 | 630 | 650 | 610 | 610 |
| 10th travel |  | 650 | 600 | 630 | 655 | 625 | 615 |
| 50th travel |  | 660 | 610 | 650 | 670 | 630 | 635 |

TABLE 1-continued

|  | Example | | | | | |
|---|---|---|---|---|---|---|
|  | 1 | 2 | 3 | 4 | 5 | 6 |
| flaw of tape after the test | 4 | 5 | 5 | 5 | 4 | 5 |

Note:
*1 silica powder having silicone oil (viscosity: 60000 cSt) absorbed therein (silicone content: 60% by weight) mean particle diameter: 50 μm
*2 silica powder having silicone oil (viscosity: 1000 cSt) absorbed therein (silicone content: 60% by weight) mean particle diameter: 50 μm
*3 silica powder having silicone oil (viscosity: 12500 cSt) absorbed therein (silicone content: 60% by weight) mean particle diameter: 50 μm

TABLE 2

|  |  | Comparative Example | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 |
| polyacetal resin | wt % | 100 | 97 | 94 | 98 | 96 | 95 | 90 | 85 | 80 | 90 | 90 | *5 |
| silica oil *1 | wt % | — | 3 | 6 | — | — | 3 | 6 | 9 | 12 | — | — | — |
| silica oil *2 | wt % | — | — | — | — | — | — | — | — | — | 6 | — | — |
| silica oil *3 | wt % | — | — | — | — | — | — | — | — | — | — | 6 | — |
| finely divided silica *4 | wt % | — | — | — | 2 | 4 | 2 | 4 | 6 | 8 | 4 | 4 | — |
| extrudability |  | 5 | 2 | 1 | 5 | 4 | 3 | 2 | 2 | 1 | 3 | 2 | — |
| moldability | sec | 1.8 | 3.5 | 4.8 | 1.8 | 1.9 | 3.0 | 4.5 | 4.8 | 7.5 | 3.9 | 3.8 | — |
| bleeding of oil |  | *6 | 2 | 1 | *6 | *6 | 3 | 2 | 2 | 1 | 2 | 1 | — |
| coefficient of friction |  | 0.33 | 0.24 | 0.22 | 0.34 | 0.38 | 0.29 | 0.26 | 0.25 | 0.24 | 0.25 | 0.25 | 0.30 |
| surface roughness | μ | 0.09 | 0.13 | 0.10 | 0.20 | 0.25 | 0.13 | 0.10 | 0.12 | 0.13 | 0.12 | 0.13 | 0.08 |
| surface hardness |  | 14.6 | 10.0 | 9.2 | 15.5 | 16.3 | 8.5 | 910 | 10.5 | 11.2 | 9.3 | 9.2 | — |
| service test travelling time: |  |  |  |  |  |  |  |  |  |  |  |  |  |
| 1st travel | sec | 620 | 650 | 660 | 700 | 755 | 680 | 675 | 675 | 670 | 680 | 660 | 600 |
| 10th travel |  | 617 | 600 | 600 | 730 | 800 | 650 | 635 | 630 | 640 | 660 | 615 | 600 |
| 50th travel |  | 640 | 590 | 590 | 750 | 640 | 660 | 640 | 650 | 660 | 660 | 630 | 615 |
| flaw of tape after the test |  | 2 | 5 | 5 | 1 | 1 | 2 | 2 | 1 | 1 | 2 | 2 | 4 |

*1 viscosity: 60000 cSt
*2 viscosity: 1000 cSt
*3 viscosity: 12500 cSt
*4 mean particle diameter: 20 mμ (primary particle)
*5 commercially available VTR cassette
*6 No evaluation conducted because no silicone oil was added.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A self-lubricating polyacetal resin composition comprising a melt-blend of a polyacetal base resin, and a self-lubricating effective amount of a silica powder having a mean particle diameter of between 5 to 300 μm and in which a silicone polymer is absorbed therein in an amount between 30 to 80% by weight of said silica powder.

2. A polyacetal resin as in claim 1, wherein said silica powder is present in an amount between 0.5 to 25 wt.% based on the total composition weight.

3. A polyacetal resin composition as in claim or 2, wherein the silicone polymer is a silicone 4. A polyacetal resin composition as in claim 3, wherein said silicone oil has a viscosity of between 500 and 200,000 cSt.

5. A self-lubricating polyacetal resin molding composition comprising a melt-blend of (A) a polyacetal base resin, (B) a silicone oil, and (C) a powdered silicone-absorbant carrier in which said silicone oil is absorbed, said powdered carrier being a silica powder which is homogeneously dispersed throughout said polyacetal base resin, wherein said silica powder has a mean particle diameter of between 5 to 300 μm and said silicone oil is absorbed in said silica powder in an amount between 30 to 80% by weight of said silica powder.

6. A polyacetal resin as in claim 5, wherein said silica powder is present in an amount of between 0.5 to 25 wt. % based on the total composition weight.

7. A polyacetal resin composition as in claim 5 or 6, wherein said silicone oil has a viscosity of between 500 and 200,000 cSt.

8. A self-lubricated molded article consisting essentially of a polyacetal composition according to claim 1 or 5.

9. A self-lubricated molded article as in claim 8, which is in the form of a magnetic tape guide member.

10. A self-lubricated guide post for magnetic tape consisting essentially of the polyacetal composition according to claim 1 or 6.

11. A method of making a self-lubricated polyacetal molding composition comprising the steps of absorbing a silicone oil within a silica powder carrier therefor, and then melt-blending a self-lubricating effective amount of the silica powder carrier with absorbed silicone oil therein, with a polyacetal base resin, wherein the silica powder has a mean particle diameter of between 5 to 300 μm and the silicone oil is absorbed in the silica powder in an amount between 30 to 80% by weight of the silica powder.

12. A method as in claim 11, wherein said method includes mixing a silicone oil having a viscosity of between 500 to 200,000 cSt with the silica powder,. allowing the silica powder to absorb the silicone oil and then forming a powder of the resulting absorbed mixture.

* * * * *

UNITED STATES PATENT AND TRADEMARK OFFICE
CERTIFICATE OF CORRECTION

PATENT NO. : 5,177,123
DATED : January 5, 1993
INVENTOR(S) : TAKAYAMA et al

It is certified that error appears in the above-identified patent and that said Letters Patent is hereby corrected as shown below:

Column 6, line 58, after "Tables" delete "were conducted".

Column 9, Claim 3, line 2, after "silicone" insert --oil--.

Signed and Sealed this

First Day of March, 1994

Attest:

BRUCE LEHMAN

Attesting Officer

Commissioner of Patents and Trademarks